(No Model.) 2 Sheets—Sheet 1.
G. E. KÜHN.
CYCLOMETER.
No. 503,485. Patented Aug. 15, 1893.
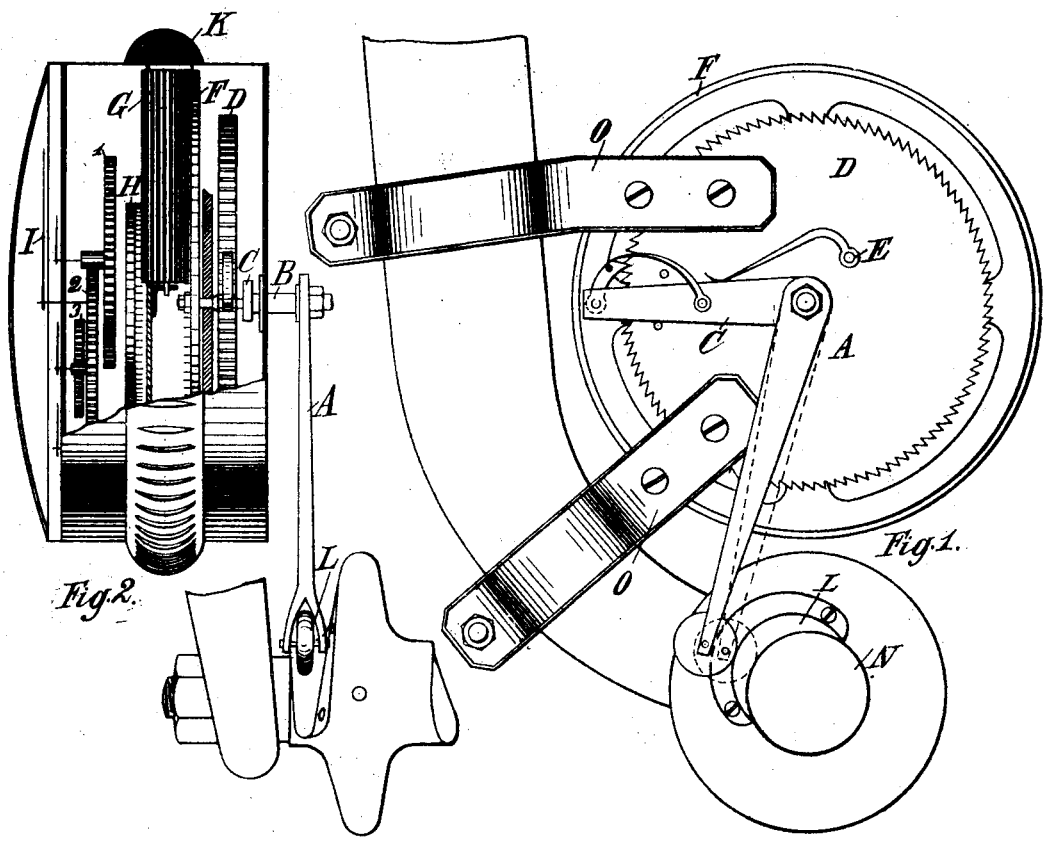
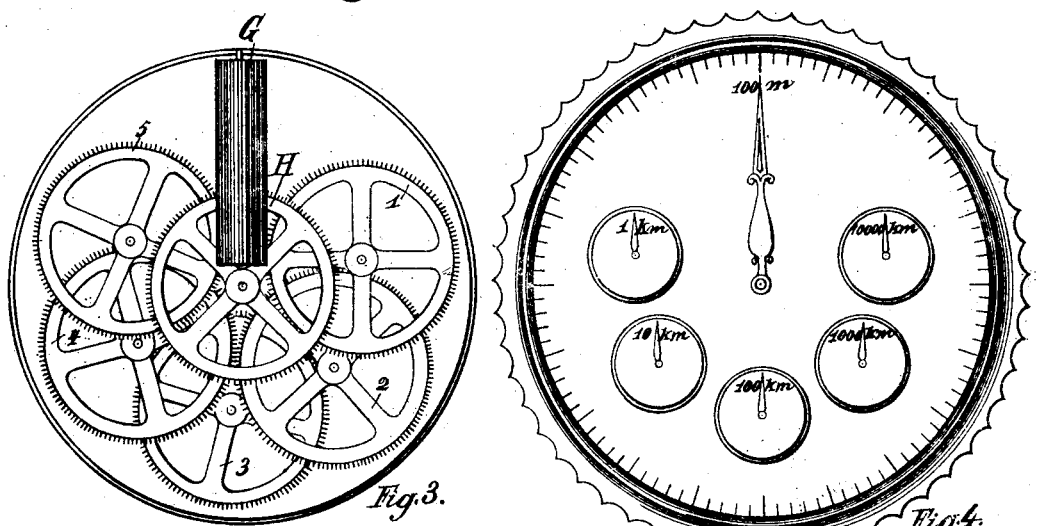

(No Model.) 2 Sheets—Sheet 2.
G. E. KÜHN.
CYCLOMETER.
No. 503,485. Patented Aug. 15, 1893.
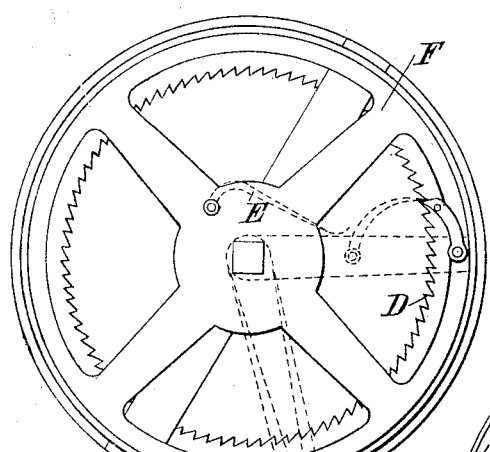
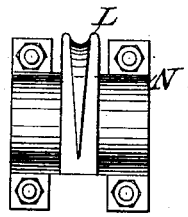
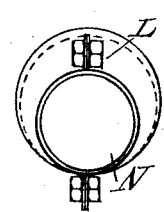
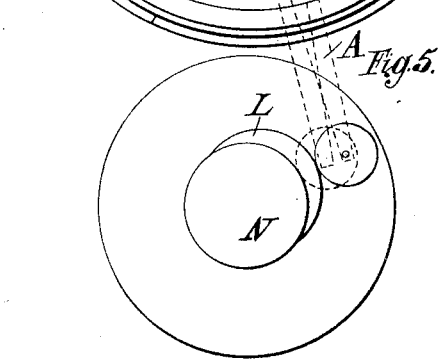
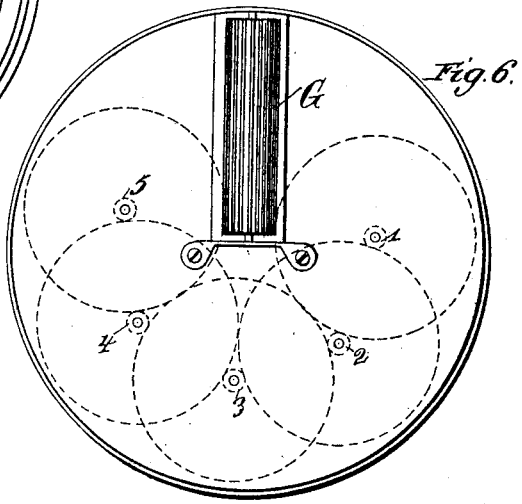
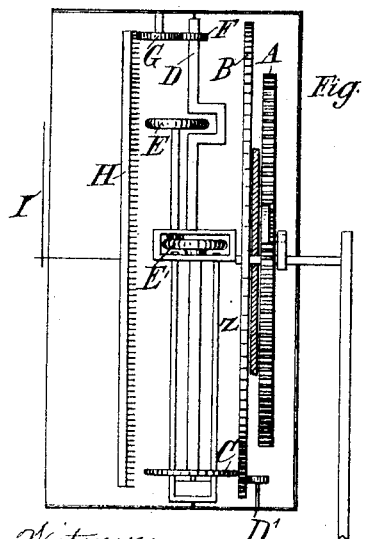
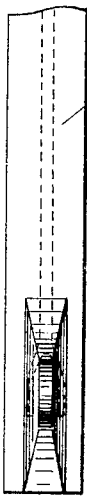
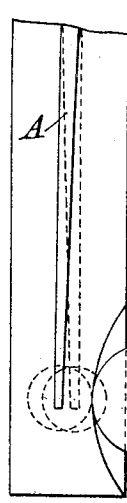
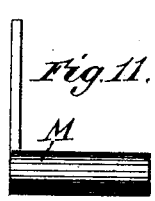
Witnesses:
Inventor,
Gustav E. Kühn
By James L. Norris
Atty.

UNITED STATES PATENT OFFICE.

GUSTAV EMIL KÜHN, OF SCHMÖLLN, GERMANY.

CYCLOMETER.

SPECIFICATION forming part of Letters Patent No. 503,485, dated August 15, 1893.

Application filed February 23, 1893. Serial No. 463,429. (No model.)

*To all whom it may concern:*

Be it known that I, GUSTAV EMIL KÜHN, chimney-sweeper, of No. 232 Radegasse, Schmölln, in the German Empire, have invented Improvements in Cyclometers, of which the following is a specification, reference being had therein to the accompanying drawings.

This invention relates to instruments for measuring and indicating the distance traveled by wheeled vehicles such as velocipedes and cabs and its objects are to simplify such instruments and to render them more reliable.

An instrument constructed as hereinafter more particularly described is attached or secured to some convenient part of the vehicle and is operated by a suitable eccentric or other projection on the hub or other rotating part. Pivoted upon the axis of the instrument is a bell crank lever one end of which is lifted by the eccentric projection. The other end of the lever carries a pawl which engages with a ratchet wheel and moves it through the space of one tooth upon each revolution of the vehicle wheel. The motion thus set up is transmitted to a suitable train of wheels by means of which the unit and multiples of the unit of distance are indicated.

The accompanying drawings to which I hereinafter refer illustrate a form of the apparatus designed for use with a velocipede and adjusted to measure and indicate the distance traveled in meters.

Figure 1 is a side elevation of the cyclometer attached to one of the forks of a velocipede, the casing being removed to show the operating mechanism. Fig. 2 is a side elevation of the cyclometer, a portion of the casing being broken away. Fig. 3 is a detail view of the train of gearing for operating the pointer of the indicating mechanism. Fig. 4 is plan view, looking at the dials of the cyclometer. Fig. 5 is a detail view, looking at the parts from the side opposite to that shown in Fig. 1. Fig. 6 is a detail plan view, showing the train of gearing by dotted lines, and the elongated pinion in full lines. Figs. 7 and 7ª are detail views of the cam or projection for operating the actuating lever of the cyclometer. Fig. 8 is a detail vertical sectional view, showing a modification of the invention; and Figs. 9, 10 and 11 are detail views, showing a cam or dog for holding the bell crank lever in its inoperative position for preventing actuation of the cyclometer.

For the purposes of description the instrument may conveniently be divided into two parts, the operative mechanism and the indicating mechanism. The former of these is contained in the back of the casing and the latter in the front. As will be seen by reference to the drawings the instrument is affixed to one of the forks of a velocipede. A spindle B at the back of the cyclometer has pivoted upon it a bell crank lever one arm of which, A, is operated by an eccentric projection L secured to the spindle or hub N of the machine. The other arm C carries a pawl which engages with the ratchet wheel D furnished with one hundred teeth. The wheel D is secured to the spindle B and is moved through the space of a single tooth for each revolution of the wheel of the velocipede. The return motion of the pawl and the bell crank lever is accomplished by the spring E. Also secured to the spindle B is the exchangeable crown or similar wheel F furnished with as many teeth as there are centimeters in the circumference of the velocipede wheel. This wheel F gears with the pinion G which in turn gears with the wheel H of the indicating device and which is also furnished with one hundred teeth. The spindle of this wheel carries the finger or pointer I to indicate up to one hundred meters. By means of suitable gearing in the ratio of one to ten motion is communicated to the rest of the wheels 1, 2, 3, 4, 5, of the indicating device each wheel thus accomplishing only one revolution to ten revolutions of the next preceding wheel. Each of the wheels carries a finger or pointer to indicate respectively kilometers and tens, hundreds, thousands and tens of thousands of kilometers.

The apparatus is preferably made in halves which are secured together by the ring K Fig. 2. This division is for the purpose of easily allowing the wheel F to be exchanged.

In the modified form of apparatus shown by Fig. 8 the wheel F and the pinion G are replaced by the friction disk B and the friction wheel C which is adjustable by the screw E and E'. This modification compared with the form previously described offers the advantage of greater correctness as it is applicable to a wheel that cannot be finally divided by centimeters, but on the other hand the previous form provides security against accidental derangement and does not need regulation.

If it is intended to use the instrument as a check or indicator on carriages or cabs which are hired out, the bell crank lever arm A must be covered in to prevent tampering. The screws by which it is attached to the vehicle may also be covered by lead seals.

The operation of the apparatus is as follows: Upon the revolution of the axis or hub N of the vehicle wheel the eccentric projection L actuates the crank lever A C and moves the wheel D, this motion being transmitted to the exchangeable toothed wheel F and pinion G to the first wheel H of the train of wheels composing the indicating device. Should it be desired to run the vehicle without operating the cyclometer a cam or stop M may be mounted on the fork or some other fixed part of the velocipede so as to be moved against the arm A of the bell crank lever and hold it out of contact with the eccentric projection L. One form of this arrangement is illustrated diagrammatically by Fig. 9.

It will of course be obvious that the instrument may be easily adapted for measuring distance in miles or by any other system.

What I claim, and desire to secure by Letters Patent of the United States, is—

1. In a cyclometer, the combination with a suitable case having distance indicating mechanism, of a rotating spindle having a ratchet wheel, gearing by which motion is transmitted from the spindle to the distance indicating mechanism, a bell-crank lever fixed on the spindle, and having one arm adapted to be moved by an eccentric or projection on the wheel axle of a vehicle, and also adapted to be swung and held out of the path of said eccentric or projection, and the other arm carrying a pawl which engages the ratchet wheel on the spindle, and means for holding the lever arm out of the path of the eccentric or projection, substantially as described.

2. The combination with a case and indicating mechanism comprising the pointer I, a train of gearing for transmitting motion to the pointer, a wheel H, and a pinion G engaging the latter, of a spindle B having a ratchet wheel D, and a crown wheel F which engages said pinion, and a bell crank lever fixed on the spindle, and having one arm adapted to be moved by an eccentric or projection on the wheel axle of a vehicle, and the other arm carrying a pawl which engages the ratchet wheel on the spindle, substantially as described.

In witness whereof I have hereunto set my hand in presence of two witnesses.

GUSTAV EMIL KÜHN.

Witnesses:
CHAS. H. DAY,
E. A. FRAISSINET.